United States Patent

[11] 3,621,357

| [72] | Inventors | Moritada Kubo<br>Tokyo;<br>Yukiharu Takahashi, Tokyo, Japan; T. William Miles, Palmerston North, New Zealand |
|---|---|---|
| [21] | Appl. No. | 853,813 |
| [22] | Filed | Aug. 28, 1969 |
| [45] | Patented | Nov. 16, 1971 |
| [73] | Assignee | Tokyo Shibaura Electric Co., Ltd.<br>Kawasaki-shi, Japan |
| [32] | Priority | Oct. 25, 1968 |
| [33] | | Japan |
| [31] | | 43/77321 |

[54] APPARATUS PROCESSING PULSE NUMBERS FOR USE IN A PID DIGITAL CONTROL SYSTEM
10 Claims, 17 Drawing Figs.

[52] U.S. Cl. .................................... 318/600,
318/603, 318/608, 318/610, 318/696
[51] Int. Cl. .................................. G05b 19/26

[50] Field of Search ......................................... 318/600, 603

[56] References Cited
UNITED STATES PATENTS
| 3,206,665 | 9/1965 | Burlingham ................ | 318/603 X |
| 3,374,359 | 3/1968 | Anderson .................... | 318/608 |

Primary Examiner—T. E. Lynch
Attorney—Flynn & Frishauf

ABSTRACT: Apparatus for obtaining the proportional difference between two pulse trains by feeding input pulses of the two pulse trains to an anticoincidence circuit, which blocks the passage of only coincidence inputs the outputs from which are supplied to a combining circuit including a flip-flop circuit and a pair of AND gate circuits, thereby canceling the first of the alternately reached pulses in two trains to obtain the rest of the pulses. By combining the apparatus with a step motor and delay circuits the integral difference and differential difference may be obtained.

FIG. 1
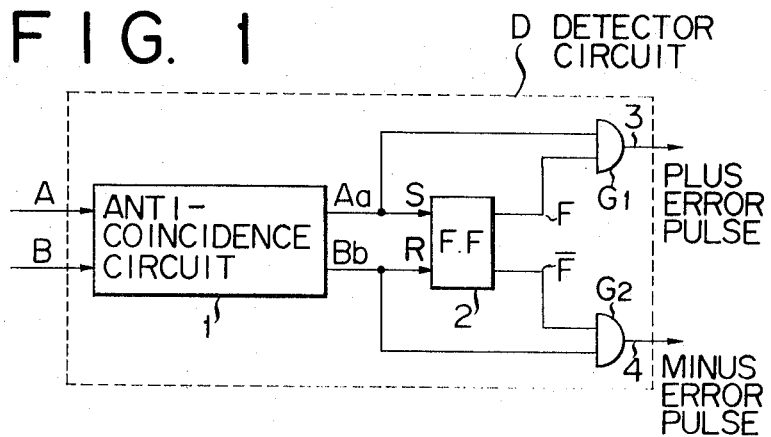
FIG. 2A
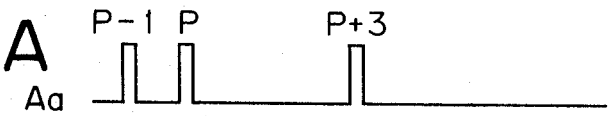
FIG. 2B
FIG. 2C
FIG. 2D
FIG. 2E
FIG. 2F
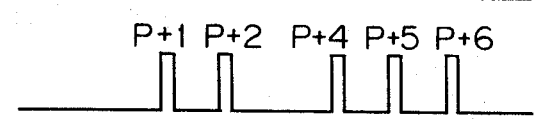
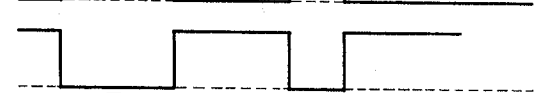
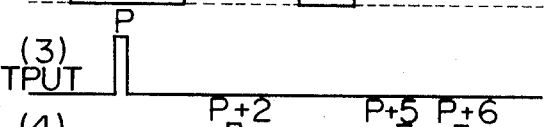
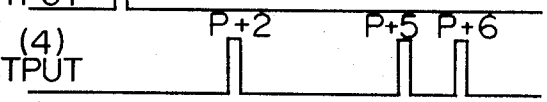
FIG. 5
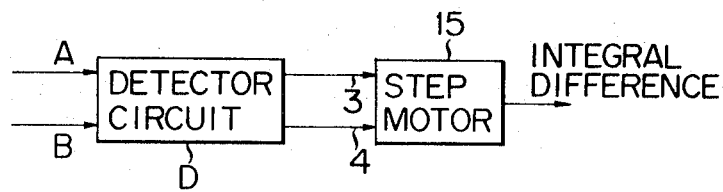

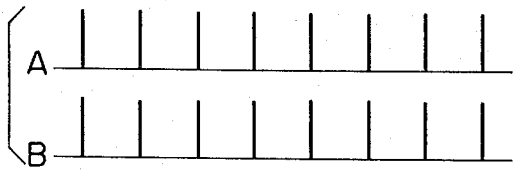
FIG. 3A
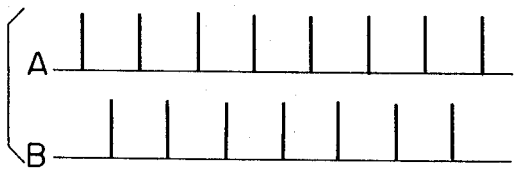
FIG. 3B
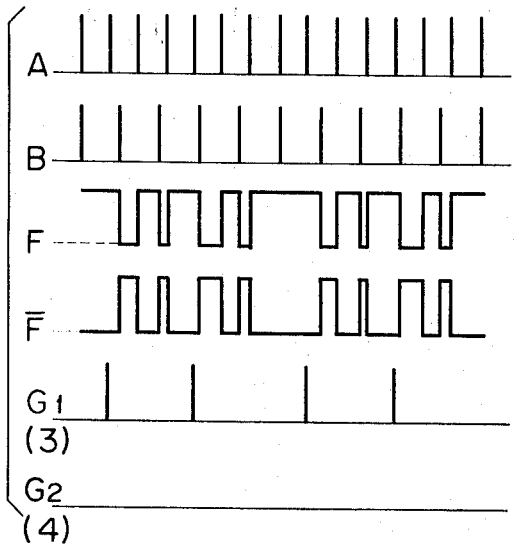
FIG. 3C
FIG. 6
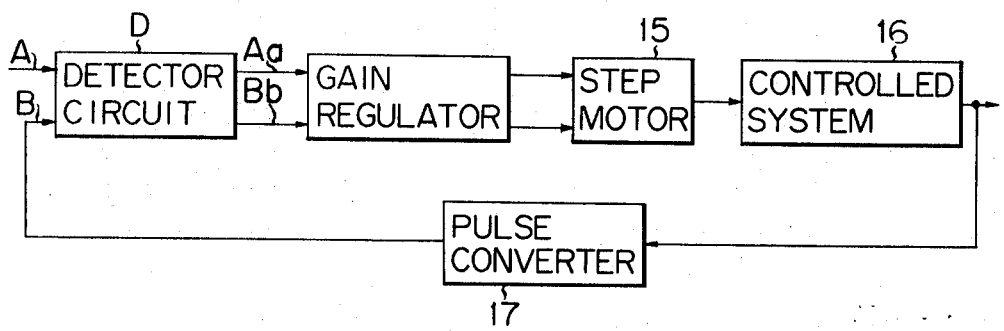

APPARATUS PROCESSING PULSE NUMBERS FOR USE IN A PID DIGITAL CONTROL SYSTEM

This invention relates to apparatus for processing pulse numbers in pulse trains, and more particularly to apparatus for processing pulse numbers in two pulse trains by digitally producing the proportional difference, integral difference and differential difference with respect to pulse frequencies.

Many of the apparatus treating pulses of two pulse trains regardless of whether the pulse trains are independent of or related to each other to obtain proportional difference, integral difference, differential difference and so forth therebetween are utilized in the field of automatic control, for instance, as digital controllers.

To obtain a difference between pulse frequencies of A and B pulse trains with the conventional apparatus of this type it is necessary to count the pulses for a certain constant interval of time; the pulses in A and B trains are fed to a reversible counter for counting them for a constant period of time, and the value of count is shifted to a register controlled by a clock pulse generator so as to obtain a plus error (A–B) and a minus error (B–A). This method requires a complicated apparatus and does not enable obtaining instantaneous errors, so that it is inconvenient for use, for instance, as a digital controller in a control system.

An object of the invention is to provide an apparatus for processing pulse numbers in pulse trains and including at least one of the circuits for obtaining proportional difference, integral difference and differential value of pulse frequencies.

The apparatus according to the invention includes at least one pulse detector circuit and said pulse detector circuit comprises an anticoincidence circuit blocking only coincident input pulses in the first and second input pulse trains and producing first and second outputs; a flip-flop circuit set by the falling edge of the pulses in the first output and reset by the falling edge of the pulses in the second output, thereby producing outputs F and $\bar{F}$; a first gate circuit receiving said first output and output F and producing the difference of the pulse number of said first input from the pulse number of said second input, and a second gate circuit receiving said second output and output $\bar{F}$ and producing the difference of the pulse number of said second input from the pulse number of said first input.

This invention can be more fully understood from the following detailed description when taken in connection with the accompanying drawings, in which:

FIG. 1 is a block diagram of one embodiment of apparatus for obtaining proportional difference between pulse frequencies of two pulse trains according to the invention;

FIGS. 2A to 2F show signal waveforms to explain the operation of the apparatus in FIG. 1 when the intervals between successive pulses are not equal for either of the two pulse trains;

Figure 4:
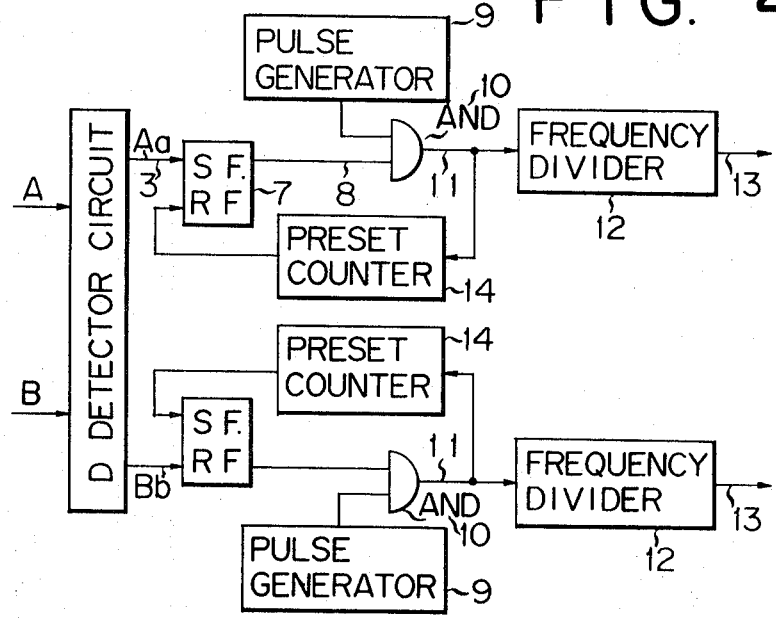
Figure 7:
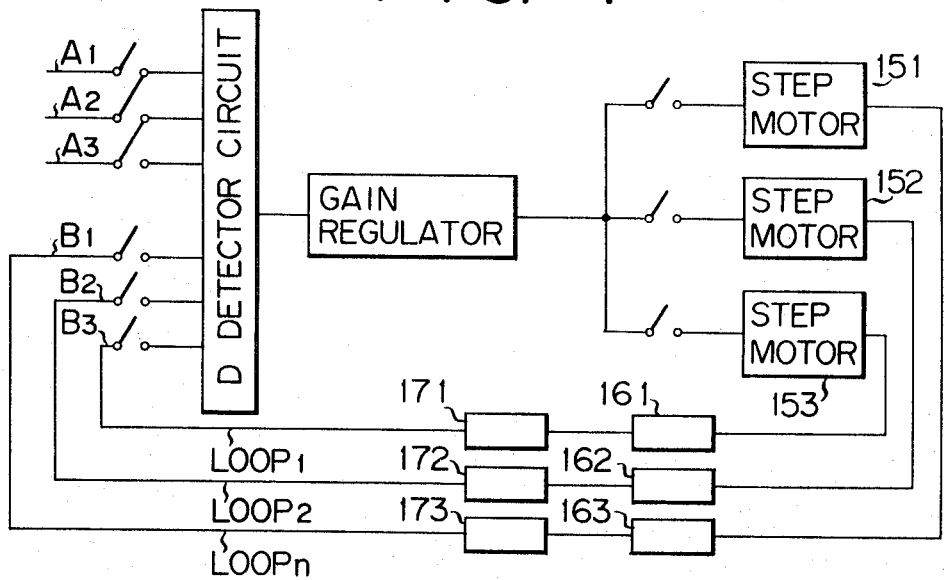
Figure 8:
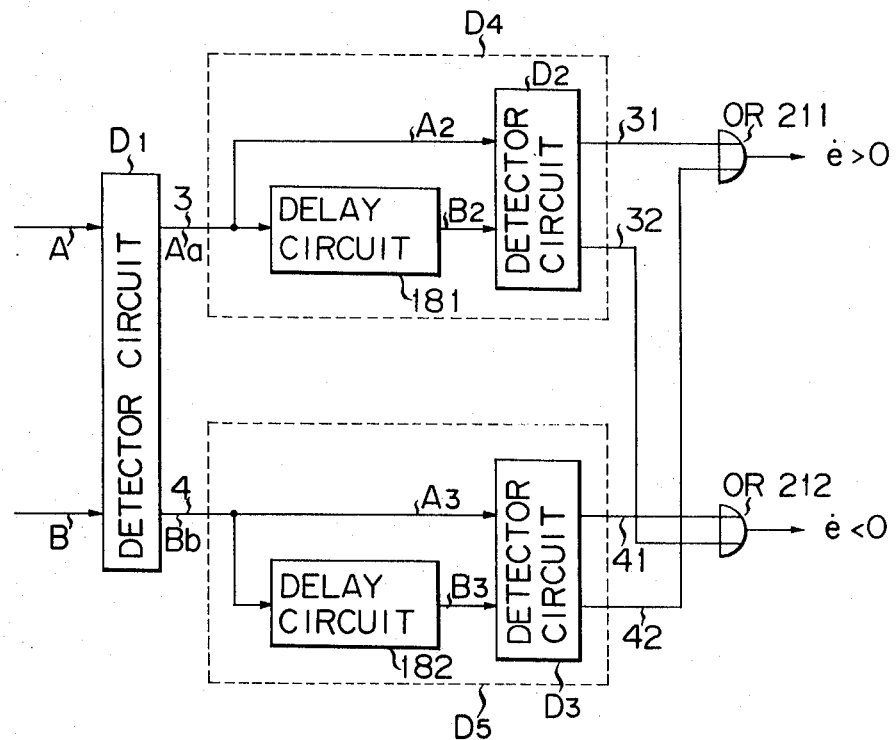
Figure 9A:
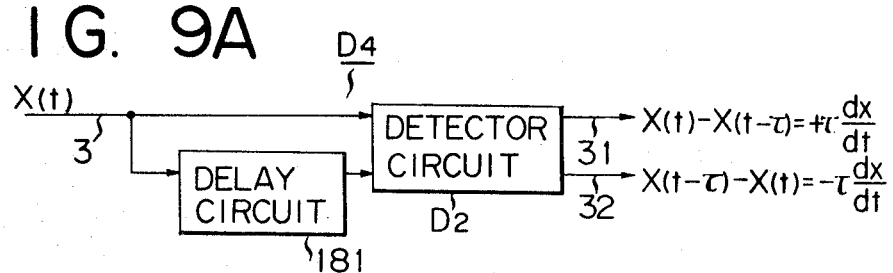
Figure 9B:
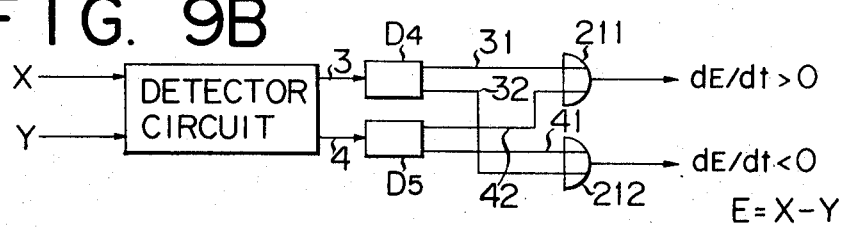

FIGS. 3A to 3C illustrate the operation of the apparatus of FIG. 1 with FIG. 3A corresponding to a case where both pulse interval and pulse phase are constant and the same for both of the pulse trains, FIG. 3B corresponding to a case where the pulses in the two pulse trains are at a constant and equal interval but occur alternately, and FIG. 3C corresponding to a case where the two pulse trains have different pulse-recurring periods;

FIG. 4 is a block diagram of another embodiment of the invention;

FIG. 5 is a block diagram of an apparatus for obtaining the integral difference between pulse frequencies of the two pulse trains embodying the invention;

FIG. 6 is a block diagram showing a system for controlling a controlled system by feeding back one of the two pulse trains out of the controlled system in accordance with the invention;

FIG. 7 is a block diagram of the embodiment of the invention shown in FIG. 6;

FIG. 8 is a block diagram of an apparatus for obtaining the rate of change of the proportional difference between pulse frequencies of two pulse trains embodying the invention; and FIGS. 9A and 9B are block diagrams for the purpose of illustrating the operation of the apparatus of FIG. 8.

This invention is now described in conjunction with one embodiment thereof with reference to FIGS. 1, 2A to 2F, and 3A to 3C. Referring to FIG. 1, anticoincidence circuit 1 receives pulse trains A and B and produces output pulse trains $A_a$ and $B_b$. Among the pulses in trains A and B, those pulses which are fed coincidentally upon anticoincidence circuit 1 (or coincidence pulses) are only blocked by this circuit, while the other pulses or anticoincidence pulses occur in output pulse trains $A_a$ and $B_b$. Thus, the anticoincidence circuit operates conversely with respect to a coincidence circuit and permits passage of the pulses that are blocked by a coincidence circuit. Flip-flop circuit 2, hereinafter termed F–F circuit, is set with pulses in train $A_a$ and reset with pulses in train $B_b$, thereby generating outputs F and $\bar{F}$. AND-gate $G_1$ receives $A_a$ pulses and F pulses as the input and generates output 3, and AND-gate $G_2$ receives $B_b$ pulses and $\bar{F}$ pulses to generate output 4. Pulse trains A and B may be either independent of or in a particular relation with each other. The arrangement surrounded by dashed line and designated by reference symbol D is hereinafter termed detector circuit to facilitate the description.

The operation of detector circuit D is now described with reference to FIGS. 2A to 2F. The pulse trains in the present consideration do not have a constant pulse period respectively and the pulses in these trains do not occur alternately. F–$\bar{F}$ circuit 2 is set and reset at the falling edge or falling of the pulses in pulse trains $A_a$ and $B_b$ as shown in FIGS. 2A and 2B to produce outputs F and $\bar{F}$ as shown in FIGS. 2C and 2D. As for pulse train $A_a$, pulse P–1 causes output F which continues until the F–$\bar{F}$ circuit is reset with pulse P+1 in train $B_b$, so that the pulses in the same train as pulse P–1 such as pulse P can pass through AND-gate $G_1$. On the other hand, the pulses such as pulse P+3 which is in the different train as the preceding pulse P+2, are blocked by gate $G_1$. Similarly, pulses P+2, P+5 and P+6 in pulse train $B_b$ can pass through AND-gate $G_2$.

Output 3 from gate $G_1$ indicates pulse numbers (A–B) or plus error for time interval as short as is almost instantaneous, and output 4 from gate $G_1$ likewise indicates pulse numbers (B–A) or minus error.

When pulse trains A and B are equal in recurring frequency and at the same phase as shown in FIG. 3A, all of the pulses are blocked by anticoincidence circuit 1, so that no outputs are produced in outputs 3 and 4.

When pulse trains A and B have an equal recurring frequency but are different in phase, pulses in each of the trains enter anticoincidence circuit 1 alternately, so that no outputs are produced in outputs 3 and 4 from the theory explained in FIG. 2.

When pulse trains A and B have respectively constant pulse frequencies shown in FIG. 3C, only coincidence pulses are blocked by anticoincidence circuit 1, thus generating a train of successive pulses as output 3 at gate $G_1$ (for pulse train of the higher frequency). The resultant output pulse frequency corresponds to A–B or plus error. There is no pulse output in gate $G_2$.

Generally stated, if $f_1$ (frequency of pulse train A) is greater than $f_2$ (frequency of pulse train B), a pulse train of frequency $(f_1-f_2)$, the plus error, is produced on the side of output 3, while when $f_1$ is less than $f_2$, a pulse train of frequency $(f_2-f_1)$, the minus error, is produced on the side of output 4.

With the just described apparatus of FIG. 1 with output difference between pulse frequencies of input pulse trains A and B is obtained in the direct form of a pulse train, which corresponds to a P-operation (proportional operation) with proportional gain 1 and is sometimes inconvenient when the apparatus is used directly in a control system. In such case it is desirable to incorporate a gain regulator which will generate pulses at a rate of $M/N$ per one difference pulse. FIG. 4 shows an example of such an apparatus, where output 11 is obtained by feeding AND-gate 10 with output 8 from F–$\bar{F}$ circuit 7 which is set with output 3 from detector circuit D and output from pulse generator 9 is fed to both frequency divider 12 dividing the input pulse frequency by $N$ and preset counter 14 with preset pulse member $M$. The output from preset counter 14 is impressed upon the reset terminal of F-$\bar{F}$ circuit 7. Thus, the pulse number of output 3 is multiplied by $M$ by preset counter 14 and divided by $N$ by frequency divider, so that the gain may be regulated to $M/N$. When $N$ corresponds to one of the integers 1, 3, 5 and 7, the gain may be regulated in 16 steps from ⅛ to 7. If it is desired only to have a gain less than 1 only the frequency divider may be connected to the side of output 3. The side of output 4 should, of course, be provided with the same gain regulator arrangement. FIG. 5 shows an apparatus for converting the signal for the integrated difference between pulse frequencies in pulse trains A and B into a corresponding rotational angle by means of step motor 15.

By applying output 3 (plus error) as clockwise signal and output 4 (minus error) as counterclockwise signal to step motor 15, the integral difference corresponding to the plus or minus error signal is indicated by the resultant angle of rotation. This apparatus is particularly effective for a process control system.

FIG. 6 shows an arrangement where step motor 15 shown in FIG. 5 controls controlled system 16, whose output is converted by pulse transducer 17 into a suitable pulse train, which is in turn supplied to detector circuit D as the second pulse train B. In this case the first pulse train A is regarded as the set pulse train.

In FIG. 7 is shown as apparatus for multiloop control utilizing the apparatus of FIG. 6. It is a kind of a sampling control system with $N$ loops, wherein the process is controlled under operation for $1/N$ of one sampling period and for the other $(N-1)/N$ portion of the period the control is achieved with the holding output from step motors 151, 152 and 153.

In said apparatus the pulses are so treated as to facilitate P-operation (proportional operation) and I-operation (integral operation. It is also possible to deal with the pulses in a manner suitable for D-operation (differential operation). This is achieved by an apparatus shown in FIG. 8. In FIG. 8, detector circuits $D_1$, $D_2$ and $D_3$ are of the same construction as the aforedescribed detector circuit D. The first and second pulse trains A and B are fed to detector circuit $D_1$, and output 3 from detector circuit $D_1$ is directly fed as the first pulse train $A_2$ to detector circuit $D_2$ wile it is fed to the same detector circuit $D_2$ as the second pulse train $B_2$ after the constant time interval $\tau$ through delay circuit 181. Detector $D_2$ produces output 31 (representing plus error) and output 32 (representing minus error). Similarly, output 4 from detector circuit $D_1$ is directly fed as the first pulse train $A_3$ to detector circuit $D_3$ while feeding it to the same detector circuit $D_3$ as the second pulse train $B_3$ after the constant time interval $\tau$ through delay circuit 182. Detector $D_3$ produces output 41 (representing plus error) and output 42 (representing minus error). Outputs 31 and 42 are fed to OR-circuir 211 ro obtain output $\dot{e}>0$, and outputs 41 and 32 are fed to OR-circuit 212 to obtain output $\dot{e}<0$. Output $\dot{e}>0$ represents the rate at which the pulse interval of pulse train $A_2$ decreases with time, i.e., the differential signal for the pulse interval of the first pulse train $A_2$, and output $\dot{e}<0$ represents the differential signal for the pulse interval of the first pulse train $A_3$.

Consideration will now be given to the detector circuit D only as shown in FIG. 9A. Denoting the first pulse train $A_2$ by $X(t)$ there is available output $|X(t)-X(t-\tau)|$ corresponding to the difference between the input pulse frequencies at output terminal 31 when $X(t)-X(t-\tau)>0$ and at output terminal 32 when $X(t)-X(t-\tau)<0$. From the definition of the differentiation given as $$\frac{dx}{dt} = \lim_{\tau \to 0} \frac{X(t) - X(t-\tau)}{\tau}$$

outputs at terminals 31 and 32 respectively equal to positive and negative values of the derivative of input pulse frequency $X$ multiplied by the differential gain $\tau$, namely, $+\tau dx/dt$ and $-\tau dx/dt$.

Representing portions $D_4$ and $D_5$ in FIG. 8 by the respective differential circuits the circuit of FIG. 8 reduces to an equivalent arrangement shown in FIG. 9B.

Denoting the pulse frequency of pulse train A by $X$ and the pulse frequency of pulse train B by $Y$, the frequency difference $E$ is $$E = X - Y$$

Accordingly, frequency difference E is differentiated to obtain both the plus derivative of output 3 and the minus derivative of output 4, which are fed as respective pulse trains to OR-circuits 211 and 212.

OUtputs are tabulated as follows:

| Output 3 | when $E>0$ | $E$ pulses/second |
|---|---|---|
| Output 4 | when $E<0$ | $-E$ pulses/second | and after these error pulses have passed through respective differential circuits, there are Output 31 when $\frac{dE}{dt}>0$ $\left|\tau\frac{dE}{dt}\right|$ pulses/second Output 32 when $\frac{dE}{dt}<0$ $\left|\tau\frac{dE}{dt}\right|$ pulses/second Output 41 when $\frac{d(-E)}{dt}>0$ $\left|\tau\frac{d(-E)}{dt}\right|$ pulses/second Output 42 when $\frac{d(-E)}{dt}<0$ $\left|\tau\frac{d(-E)}{dt}\right|$ pulses/second.

As these pulse trains are derived through the OR gate circuit, differential signals of $\dot{e}>0$ and $\dot{e}<0$ from the output of OR gate circuits 211 and 212 respectively.

Of course, P and D (proportional and differential) operations may simultaneously be carried out with the apparatus of FIG. 8 by taking out outputs 3 and 4 to obtain proportional differences for $\dot{e}>0$ and $\dot{e}<0$.

As has been described in the foregoing, according to the invention pulses in two pulse trains are treated in such a manner as to digitally obtain at least one of the proportional, integral and differential differences between pulse frequencies of these pulse trains which is very effective when applied in various control systems. Also the fact that the two pulse trains may be either independent of, or related to, each other will extend the range of application of the foregoing pulse treatment.

What we claim is:

1. Apparatus for processing pulse signals to obtain signals corresponding to the frequency difference between two pulse trains comprising a detector means including:

an anticoincidence circuit eliminating only coincident input pulses between first and second input pulse trains and producing first and second output pulse trains respectively consisting of the remainder of the pulses of the corresponding input pulse trains other than said eliminated coincident pulses;

a flip-flop circuit set by a falling portion of the pulses in said first output pulse train and reset by a falling portion of the pulses in said second output pulse train to produce respective outputs F and $\bar{F}$;

a first gate circuit receiving said first output pulse train and said output F and producing the difference of the pulse frequency of said first input pulse train from the pulse frequency of said second input pulse train; and a second gate circuit receiving said second output pulse train and said output $\bar{F}$ and producing the difference of the pulse frequency of said second input pulse train from the pulse frequency of said first input pulse train;

the outputs of said first and second gate circuits representing the difference between the frequencies of said first and second input pulse trains.

2. Apparatus as claimed in claim 1, comprising a gain regulator coupled to the outputs of said first and second gate circuits for regulating the gain of the output pulse trains from said first and second gate circuits.

3. Apparatus as claimed in claim 2, wherein said gain regulator comprises flip-flop circuits respectively connected to the outputs of said first and second gate circuits, pulse generators, AND gates each receiving outputs from the corresponding ones of said regulator flip-flops and said pulse generators, frequency dividers each receiving an output from a corresponding one of said AND gates, and preset counters each receiving an output from a corresponding one of said AND gates and providing an output to the reset terminal of a corresponding one of said regulator flip-flop circuits.

4. Apparatus as claimed in claim 1, comprising a step motor receiving the outputs from said gate circuits respectively as clockwise and counterclockwise signals for converting the integral of the difference between the pulse frequencies of said first and second input pulse trains into a corresponding angle of rotation.

5. Apparatus as claimed in claim 1, comprising a step motor for converting the difference between the pulse frequencies of said first and second input pulse trains into an integral difference corresponding to an angle of rotation, a controlled system controlled by said step motor and a pulse converter converting an output from said controlled system into said second input pulse train.

6. Apparatus as claimed in claim 1, comprising means for controlling the gain of the output pulse trains from said first and second gate circuits, a step motor receiving the outputs from said gain control means, a controlled system controlled by said step motor, and a pulse converter converting output from said controlled system into said second input pulse trains.

7. Apparatus as claimed in claim 1 comprising delay means coupled to receive said first input pulse train, the output of said delay means comprising said second input pulse train, the outputs of said gate circuits being a function of a differential value of the pulse number density of said first pulse train.

8. Apparatus as claimed in claim 1 comprising:
second and third detector means, the outputs from the first and second gate circuits of said first detector means being coupled to a first input of said second and third detector means, respectively;
second and third delay means, said second delay means coupling the output from said first gate circuit of said first detector means to the other input of said second detector means and said third delay means coupling the output of said second gate circuit of said first detector means to the other input of said third detector means;
at least one gate circuit coupled to the output of at least one of said second and third detector means for deriving plus and/or minus, differential values of pulse number densities.

9. Apparatus as claimed in claim 1 wherein said first and second gate circuits are AND circuits, the output of said first gate circuit representing a plus difference and the output of said second gate circuit representing a minus difference between the frequencies of said first and second input pulse trains.

10. Apparatus as claimed in claim 8 comprising a first OR gate coupled to the first output of said first detector means and to the second output of said second detector means, and a second OR gate coupled to the second output of said first detector means and to the first output of said second detector means.

* * * * *